March 18, 1947. H. J. CRABBS Re. 22,853

CIRCUIT INTERRUPTER

Original Filed Aug. 15, 1934 3 Sheets-Sheet 1

WITNESSES:

Wm. B. Sellers.

Q. T. Stratton

INVENTOR

Herbert J. Crabbs.

BY

F. W. Lyle

Attorney

March 18, 1947. H. J. CRABBS Re. 22,853

CIRCUIT INTERRUPTER

Original Filed Aug. 15, 1934 3 Sheets-Sheet 2

WITNESSES:

Wm. B. Sellers.

A. T. Stratton

INVENTOR

Herbert J. Crabbs.

BY

F. W. Lyle.

Attorney

March 18, 1947. H. J. CRABBS Re. 22,853

CIRCUIT INTERRUPTER

Original Filed Aug. 15, 1934 3 Sheets-Sheet 3

WITNESSES:

Wm. B. Sellers.

A. T. Shatton

INVENTOR

Herbert J. Crabbs.

BY F. W. Lyle.

Attorney

Reissued Mar. 18, 1947

Re. 22,853

UNITED STATES PATENT OFFICE 22,853

CIRCUIT INTERRUPTER

Herbert J. Crabbs, Wilkinsburg, Pa., assignor to Westinghouse Electric Corporation, a corporation of Pennsylvania Original No. 2,112,071, dated March 22, 1938, Serial No. 739,891, August 15, 1934. Application for reissue January 2, 1947, Serial No. 719,702. Renewed March 4, 1937

24 Claims. (Cl. 200—48)

My invention relates generally to circuit interrupters, and it has particular application to disconnecting switches of either the outdoor or the indoor type.

Disconnecting switches are used principally for sectionalizing or isolating portions of a transmission line or a power distribution network, and, in their simplest form, the devices usually comprise little more than a knife switch of the proper capacity which is provided with a suitable latching means for preventing undesired openings of the circuit. In their normal operation, the switches are rarely called upon to interrupt any considerable amounts of power, and in fact, the switches known to the art in the past have been quite incapable of opening more than very small amounts of power, particularly at high voltages.

With the increased growth of interconnected power networks and transmission systems it has become increasingly important that these sectionalizing and isolating switches shall be capable of opening at least moderate amounts of power, and the older type of switches has proven unsatisfactory for this service. In fact, if voltages in the neighborhood of 100 kv. are used, an ordinary knife blade disconnecting switch is incapable of opening even the line charging current without danger of drawing long uncontrolled arcs which may short circuit and seriously damage adjacent equipment.

Various expedients for obviating these difficulties have been proposed and some of them have been tried. None of the proposed arrangements, however, has been entirely satisfactory. Some are too expensive and thereby economically impractical, since large numbers of the devices must be used in even a moderately sized transmission line. Others are not entirely safe in operation, and even the best of the prior art devices has not been a commercially successful development.

The principal object of my invention, therefore, is to provide a disconnecting switch which shall be capable of opening circuit carrying considerable amounts of power and which, at the same time, shall be relatively low in cost.

Another object of my invention is to provide an improved disconnecting switch which shall be simple in design and rugged in construction which shall be absolutely reliable in operation, even when subjected to the adverse weather conditions, and which includes means for interrupting the arc which may be established incident to the opening of the circuit.

A further object of my invention is to provide means whereby an expulsion-type circuit interrupter may be combined with a blade-type disconnecting switch in such manner that a single operating mechanism may be utilized for actuating both the blade and the expulsion-type device.

In accomplishing these objects of my invention I provide, in the preferred embodiment of my device, a three-insulator vertical break disconnecting switch. As in the conventional structure of this type, one of the insulators is rotatable and is connected to the blade by suitable linkages in order that the blade may be swung to the open and to the closed-circuit position by rotating the insulator column. In addition, I provide a tube of insulating material having a length substantially equal to the separation of the stationary insulator columns, a conducting member movable through the tube to provide an electrical circuit in parallel with the blade, and an actuating mechanism intermediate the conducting member movable through the tube and the rotatable insulator.

The various parts are so correlated that during the opening operation the blade is swung from the closed-circuit position to the open circuit position while the conducting means disposed within the tubular member carries the current flowing through the device. Then, as the opening operation progresses, the conducting means moves through the tubular member so as to establish the arc formed incident to the opening of the controlled circuit within the passage therein. This tube acts as an expulsion-type circuit interrupter and effects the extinguishment of the arc within a short period of time.

Later, the tubular member itself is swung so as to cause an air break to exist in the electrical circuit through the switch. The tube is preferably lined with a material that is capable of evolving an arc extinguishing gas when placed in proximity to an electric arc in order to intensify the expulsive effect, and the dimensions of the conducting means are such that the tube is closed at one end during the arc drawing operation for the same reason.

The principles and the mode of operation of my invention will be made more apparent by reference to the accompanying drawings, wherein I have disclosed the structural details of a disconnecting switch which includes the principal elements of my invention.

Figures 1, 2:
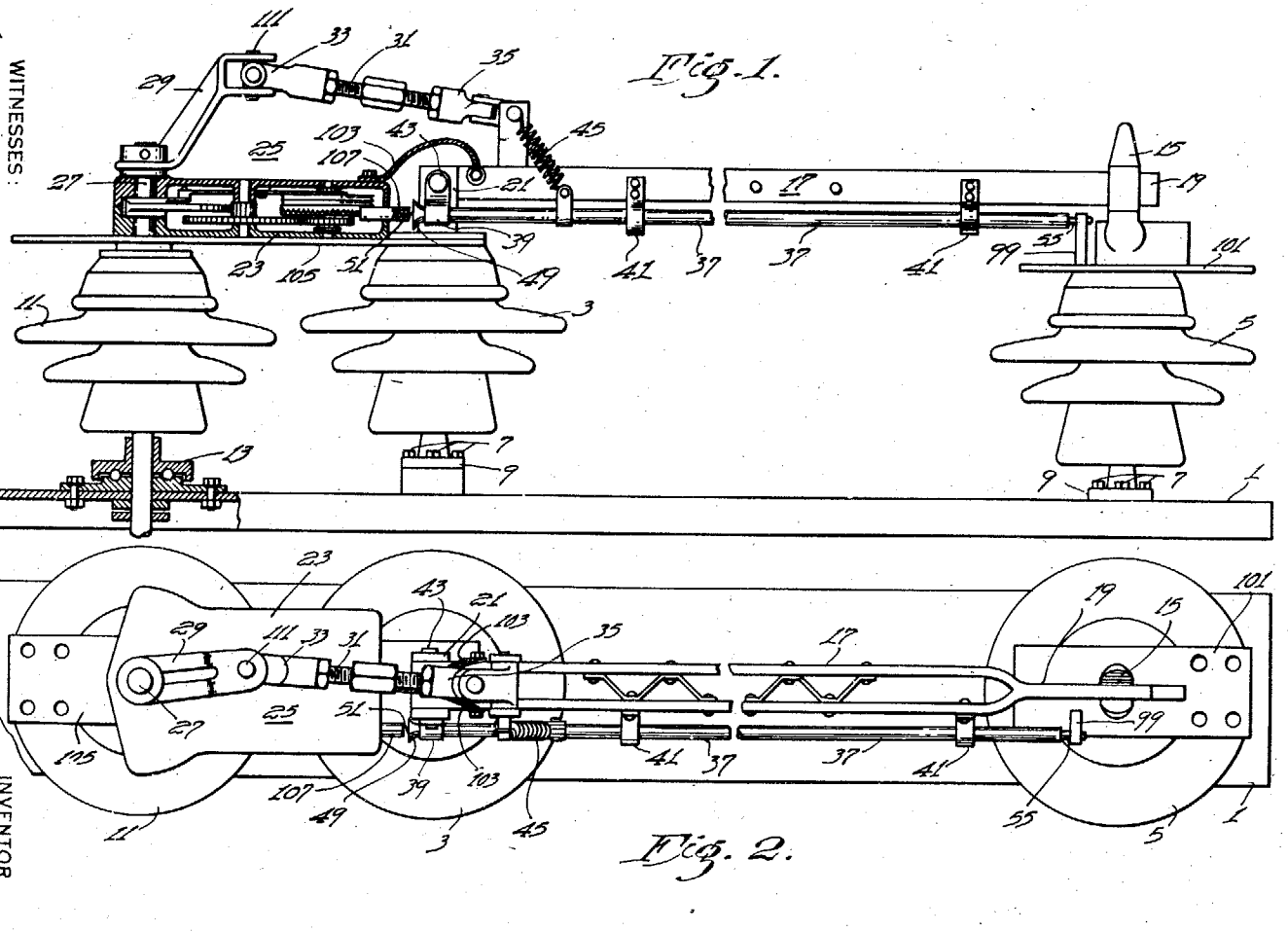
Figure 1 is an elevational view, partially in section of a three-insulator disconnecting switch embodying the principal features of my invention; the switch is illustrated in the closed circuit position.
Fig. 2 is a plan view of the switch shown in Fig. 1.

All but a portion of the closure cover has been cut away to more clearly illustrate the structural features involved.

The preferred embodiment of my invention comprises generally a base 1, which may be formed from a channel-shaped section of structural steel or the like, a pair of stationary insulators 3 and 5 mounted upon the base channel 1 through the agency of suitable bolts 7 which engage the flanges 9 forming a part thereof, and a rotatable insulator 11 supported upon the base 1 by means of a suitable ball bearing 13. A jaw member 15 is positioned upon the top of the right hand insulator column 5 and is adapted to be engaged by the movable end 19 of the bifurcated blade member 17 which is supported upon a suitable U-shaped yoke member 21 affixed to the other stationary insulator column 3.

A metallic closure 23 wherein the actuating mechanism 25 for the expulsion-type unit is contained, is likewise positioned upon the second stationary insulator column 3. The rotatable insulator 11 has a shaft portion 27 which extends through the left-hand end of the closure 23 and is adapted to be keyed to the main actuating crank 29 for the blade member. This crank 29 is connected to the blade member 17 through a tie-member 31 and a pair of universal joint linkages 33 and 35.

Figures 3, 4, 5:
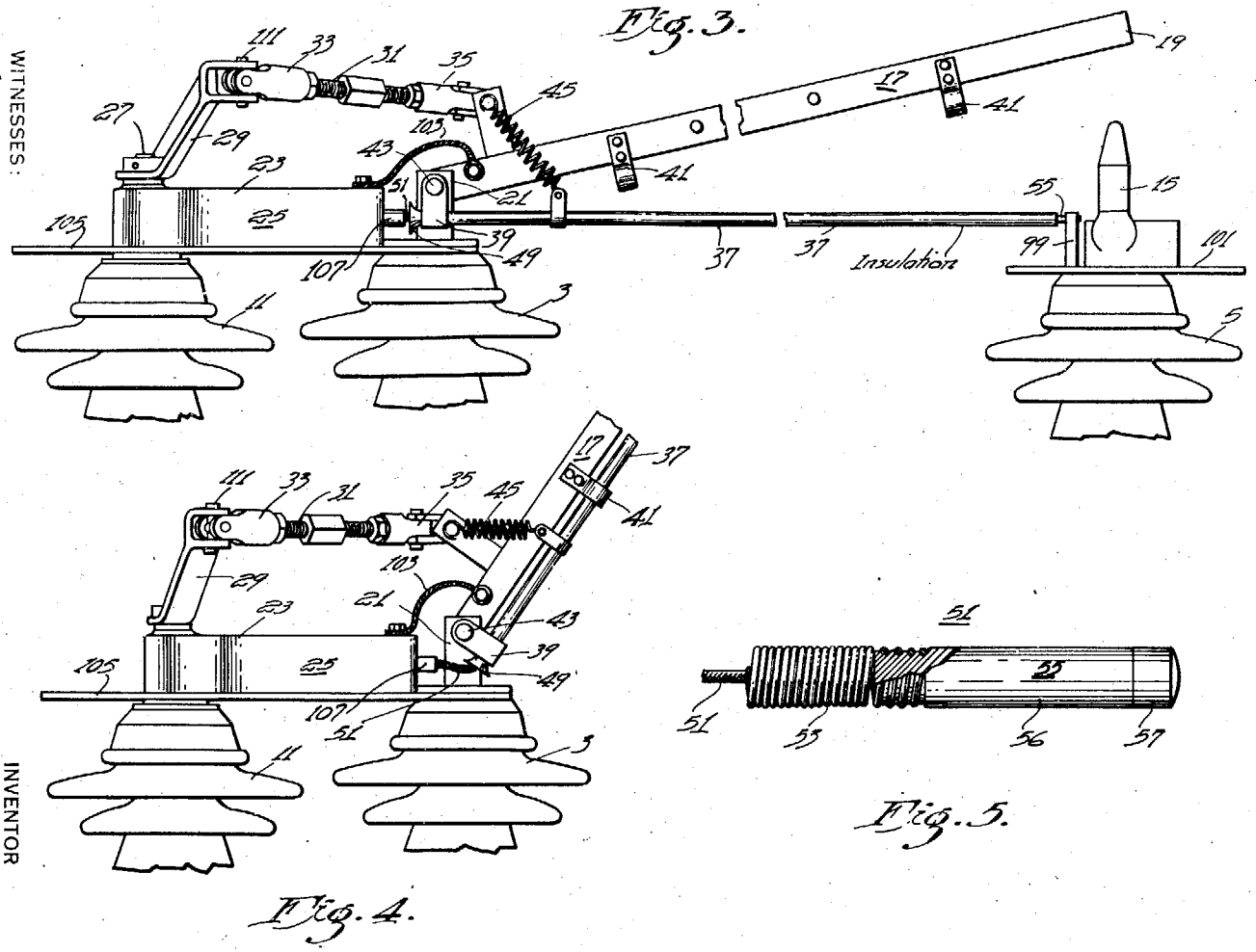
Fig. 3 is a fragmentary view showing the position of the various moving parts of the switch illustrated in Figs. 1 and 2 in the partially open position.
Fig. 4 is a fragmentary view of the rotatable insulator and portions of the blade and the blade supporting means; the various structural elements are shown in the fully open position.
Fig. 5 is an enlarged detail view of the flexible conducting means forming a part of the expulsion unit circuit interrupter.

The expulsion-type circuit interrupting means which is utilized for extinguishing the arcs which are formed incident to the opening of the circuit controlled by the switch, includes a hollow tubular member 37, preferably of fibre which has been suitably water-proofed on the outer side. This tubular member defines the walls of an arc passage and is adapted to be pivotally supported upon a clamp member 39 affixed thereto adjacent the left hand end. A pair of spring clips 41 affixed to the blade 17 normally support and position the tubular member with respect to that member. The clamp member 39 is journalled upon the pivot pin 43 for the blade 17 in order that the tube 37 and the blade means 17 may be independently movable. A spring 45 is disposed intermediate the blade member 17 and the tubular member 37 in order that those two members shall normally be biased into engagement with each other, as is shown in Figs. 1 and 4, and also in order that the tubular member 37 can be caused to automatically swing to the normal open-circuit position subsequent to the opening movement of the blade itself. The left-hand end of the tubular member 37 terminates in a funnel-shaped portion 49 through which the flexible conducting means 51 extends into the arc passage within the tube.

This flexible conducting means 51 is shown particularly in Fig. 5 and comprises a closely wound spring 53 having a flexible conducting shunt 51 positioned within the central opening therein. The right-hand end of the spring is rigidly affixed to a suitable contact member 55, the body portion 56 of which is preferably of copper and the extreme end portion 57 of which is preferably of a conducting, arc resisting material. The spring 53 is of considerable strength while at the same time, it possesses a considerable amount of flexibility. Its maximum diameter is slightly less than the maximum diameter of the arc passage within the tubular member 37 wherein it is adapted to move, and it becomes immediately apparent that the operation of this conducting means will very closely approximate that of the cable release utilized on the ordinary hand camera. In other words, the conducting means 51 while being sufficiently flexible to permit the tubular member 37 to be swung to the open circuit position while it is moved therewithin, is of sufficient strength and rigidity that the operation of the device is reliable and positive. The flexible shunt 51 is provided for increasing the maximum current-carrying capacity of the conducting means 51.

Figure 6:
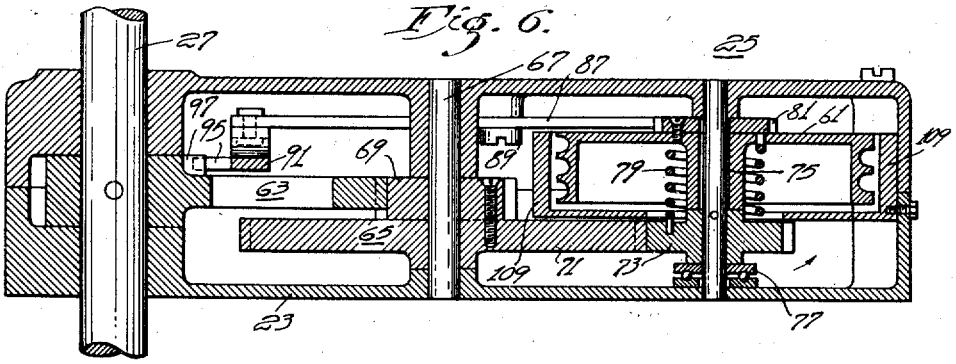
Fig. 6 is a sectional view taken on the line VI—VI of Fig. 7 showing the details of construction of the actuating mechanism for the expulsion unit.
Figure 7:
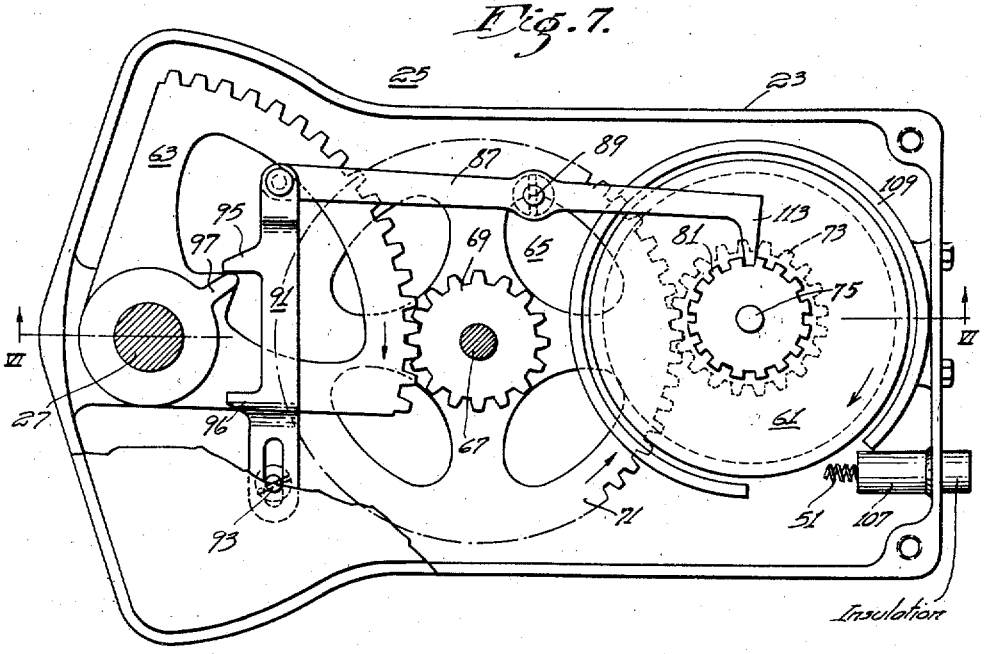
Fig. 7 is a plan view of the actuating mechanism for the expulsion unit.

For moving the flexible conducting means within the arc passage, the walls of which are defined by the tubular member 37, I prefer to provide an actuating mechanism such as that shown particularly in Figs. 6 and 7. Essentially, this mechanism comprises little more than a grooved drum 61 whereon the flexible conducting means 51 is wound and from which it is unwound during the operation of the switch, and suitable gear means for interconnecting this drum with the rotatable insulator 11. The drum itself is provided with means whereby it is directly connected to the gearing elements through a spring means during the closing operation but is required to have lost-motion to stress the spring means during the opening operation. By this arrangement, it is possible to move the blade 17 to the full open position before the circuit through the switch is opened by the expulsion-type interrupting means. Moreover, as the blade 17 nears its uppermost position, the energy charged in the spring means, by virtue of the relative movement of the gear elements while the drum remains stationary, is released so as to cause the flexible conducting means 51 to move through the arc passage at high speed, thereby establishing the arc within that passage.

Specifically, the actuating mechanism for the expulsion-type arc extinguishing means comprises the metallic closure 23 mentioned above, a gear member 63 adapted to be keyed to the upwardly extending shaft portion 27 of the rotatable insulator, a second gear wheel 65 journalled upon a suitable shaft member 67 and having a pinion portion 69 for engaging the first-mentioned gear wheel and a wheel portion 71 for engaging the gear 73 which actuates the drum. This latter gear 73 is keyed to a second shaft 75 which is supported upon a suitable ball bearing 77 affixed to the base of the closure 23. The drum 61 is journalled upon this second shaft 75 and is connected to its actuating gear 73 by means of a coil spring 79.

Affixed to the upper portion of the grooved drum 61 is a notched wheel 81, which is utilized for assuring that the electrical circuit through the switch shall always be finally opened by the expulsion type arc extinguishing means. A latch member 87, pivotally supported upon the upper half of the closure 23 by means of a screw 89, is provided for engaging the notched wheel 81. One end of this latch member 87 pivotally engages one end of an actuating member 91, the other end of which is slidably supported upon a screw 93, affixed to the upper portion of the closure 23. This actuating member includes a pair of outwardly projecting portions 95 and 96 which are adapted to engage a cooperating portion 97 formed integral with the gear wheel 63.

Through the arrangement of the latch 87 the drum 61 is prevented from rotating toward the open-circuit position during the greater portion of the opening movement of the rotatable insulator 11, and it is only when the projecting portion 97 of the gear wheel 63 engages the outwardly projecting portion 96 of the latch actuating member 91 near the end of that movement that the latch 87 disengages the notched wheel 81 so as to permit the spring 79, which has been stressed by virtue of the relative movement of the drum 61 and the actuating gear 73 therefor, to rotate the drum to the normal open-circuit position, thereby drawing an arc within the arc passage defined by the tubular member 37. During the circuit-closing operation, the flexible conducting means 51 is moved outwardly through the tubular member 37 and engages the cooperating conducting means 99 supported upon the outboard stationary insulator 5 as the interrupter is moved to the fully closed position by the drive from rotating gear 73 to drum 61 through spring 79.

The conducting means 99, which is adapted to be engaged by the solid contact portion 55 of the flexible conducting means 51, preferably comprises an up-extending member rigidly affixed to the support plate 101 for the jaw 15 and having a suitably proportioned opening therein for engaging the sides of the contact portion 55. It is desirable that this conducting means 99 be provided with a certain amount of resilience in order that the proper contact pressure may be secured between the cooperating contact surfaces.

A pair of flexible conducting shunts 103 are utilized for interconnecting the blade means 17 with the metallic closure 23 for the interrupter actuating means. This closure 23, in turn, is electrically connected to the other support plate 105 which serves as a terminal for the device. The shunt 51 and the associated contact means 55 for the expulsion type interrupter are electrically connected to the support plate 105 affixed to the top of the right-hand insulator through the actuating mechanism 25.

A tubular member 107 of insulating material is disposed within the outer wall of the closure 23 for the purpose of guiding the flexible conducting means 51 during the operation of the switch, and a suitably proportioned hollow cylindrical member 109 is positioned about the drum 61 for assuring that the flexible conducting means shall be moved thereby without kinking.

The circuit interrupter is shown in the closed-circuit position in Figs. 1 and 2, and the actuating mechanism is likewise shown in the closed-circuit position in Figs. 6 and 7. It will be noted that the center line of the actuating linkage for the blade 17 (the crank 29 and the tie link 31) is to the left of the center line of the switch. By this arrangement, the blade is effectively latched in when the switch is in the closed-circuit position, because the pivot pin 111 intermediate the actuating crank and the tie-linkage must be moved across the center line of the switch (Fig. 2) before the interrupter can be opened (rotation of the insulator 11 in the counter-clockwise direction being prevented by a suitable stop).

To open the switch the rotatable insulator 11 is turned in a clockwise direction (Fig. 2). This movement is directly transmitted to the main operating crank 29 and the tie link 31 intermediate that crank and the blade, and as it progresses, it causes the blade 17 to be lifted from the position shown in Fig. 1 toward the open-circuit position shown in Fig. 4. At the same time, the gears intermediate the rotatable insulator 11 and the drum 61 to which the flexible conducting means 51 is affixed are likewise rotated. Rotation of the drum 61, however, is prevented by virtue of the fact that the projecting portion 113 of the latch 87 engages the notched wheel 81 which is directly keyed to the drum itself. Thus, the only effect of the rotation of the rotatable insulator 11 during the initial stages of the circuit-opening operation, so far as the expulsion type unit is concerned, is to store energy in the spring 79 intermediate the drum 61 and the gear means. However, as the rotatable insulator 11 and the blade 17 approach the fully open position, the outwardly projecting portion 97 of the first gear 63 engages the cooperating lower portion 96 of the latch actuating member 91 and causes the latch to disengage the notched wheel. The energy in the spring is then released, and as a result, the drum 61 is rotated at high speed, thereby causing the flexible conducting means 51 to be moved longitudinally through the tubular member 37 which defines the walls of the arc passage. This movement takes place at very high speed, and the arc incident to the opening of the circuit controlled by the interrupter is perforce drawn within the tube.

While the blade member 17 is being moved to the open-circuit position, the spring 45 which tends to keep the blade member 17 and the tube 37 in their normal alignment, is stressed, and immediately following the movement of the end portion 55 of the flexible conducting means 51 out of engagement with the cooperating conducting means 99 disposed on top of the right-hand stationary insulator 5, the tube 37 becomes free to move under the influence of this spring. As a result, the tube 37 rotates from the position shown in Figs. 1 and 3 to the position shown in Fig. 4, in which position the spring clips 41 reengage the tube so as to hold it and the blade in their normal respective positions.

The closing operation differs to a slight degree from the opening operation. The rotatable insulator 11 is rotated in a counter-clockwise direction and this movement is directly transmitted to the blade 17 and the tubular member 37 supported thereon. As a result, both of those members are simultaneously moved from the position shown in Fig. 4 to the position shown in Fig. 1, the electrical circuit being initially established between the blade member 17 and the contact jaw 15. During this movement, the gear actuating mechanism 25 intermediate the rotatable insulator 11 and the drum 61 causes the drum to rotate so as to move the flexible conducting means 51 outwardly through the tubular arc passage in the direction of the outboard insulator, the drum 61 being directly connected to the gear mechanism by means of the spring 79. In the final stages of the closing movement the outer end 55 of the flexible conducting means 51 is caused to re-engage the cooperating member 99 supported upon the outboard insulator, and the latch 87 is moved so as to cause a re-engagement of the notched wheel with the cooperating portion 113 of the pivoted latch member.

From the foregoing, it will be seen that the electrical circuit through the switch is always finally interrupted by the expulsion type circuit interrupting device, which has a considerably greater arc interrupting capacity than the blade alone, regardless of how rapidly the blade might be moved. Also, the closing operation of the switch is so controlled that excessive currents are prevented from flowing through the expulsion type arc extinguishing means, the circuit through the switch being initially closed through the blade member.

The tubular member 37 which defines the walls of the arc passage is preferably of fibre, as mentioned above, for the reason that this material is capable of evolving very considerable amounts of arc extinguishing gas when placed in proximity to an electric arc, and because that material can be weather-proofed comparatively easily. It is within the province of my invention, however, that other suitable materials could be used, and if desired, a refractory tube which is lined for at least a portion of its length, with a material capable of evolving a suitable arc extinguishing gas, might be used.

The end portion 55 of the conducting member is preferably of substantially the same size and the same outline as the arc passage within the tubular member, in order that it may serve to close one end of that passage during the circuit-opening operation. By this means, since the other end is normally open, the arc extinguishing gas is caused to flow longitudinally through the arc passage in venting, and thus, by its expulsive action, effects an efficient extinguishment of the arc. A round arc passage has been shown and described in the drawing. It is obvious, of course, that other cross-sectional outlines could be used, and it is my intention that the term "tubular" should include such other outlines.

The actuating mechanism which has been shown in the preferred embodiment of my invention is, of course, but one of the many mechanical arrangements which might be used for effecting the operation of a device embodying the features of my invention. These other arrangements will suggest themselves to those skilled in the art, and it is my intention that the accompanying claims should cover such other schemes.

In the foregoing description of my invention, I have described a new form of disconnecting switch which is particularly suitable for use with present-day transmission network distribution systems. My improved disconnecting switch is capable of interrupting considerable amounts of power without danger of prolonged arcing and without danger of short-circuiting adjacent equipment. In the preferred embodiment of my invention, the structural elements are entirely protected from the weather and such parts as might be exposed to ice formation are all subjected to either a torsional or a tension stress during the operation of the switch. This assures satisfactory operation under even the most adverse possible conditions. In addition, the structure of my invention is comparatively simple and is relatively inexpensive to manufacture.

It is my belief that the principal novelty of my invention resides in the combination of cooperating elements which have been particularly pointed out in the appended claims. It is my intention that the language of these claims should be accorded the broadest reasonable construction, and that my invention should be limited only by what is expressly stated therein and by the prior art.

I claim as my invention:

1. In a circuit interrupter; a pair of spaced conducting members; a swingable means adapted to bridge said conducting members when said interrupter is in the closed-circuit position so as to provide an electrical circuit therebetween; said swingable bridging means comprising conducting means and a tubular means for defining an arc passage wherein said conducting means is adapted to move, at least a portion of said tube being lined with a material that is capable of evolving an arc extinguishing gas when placed in proximity to an electric arc; and actuating means for said interrupter including means for moving said conducting means through said arc passage and means for swinging said tube to the open and to the closed circuit position.

2. In a circuit interrupter; a pair of spaced conducting members; a swingable means adapted to bridge said conducting members when said interrupter is in the closed circuit position so as to provide an electrical circuit therebetween; said swingable bridging means comprising conducting means and a tubular means for defining an arc passage wherein said conducting means is adapted to move, the cross-sectional area and outline of said conducting means being substantially the same as the cross-sectional area and outline of said tubular passage in order that said conducting means shall substantially close one end of said tube during the arc drawing operation, the other end of said tube being open during the circuit-opening operation; at least a portion of said tube being lined with a material that is capable of evolving an arc extinguishing gas when placed in proximity to an electric arc; and actuating means for said interrupter, including means for moving said conducting means longitudinally through said passage within said tubular means to cause the arc which is formed incident to the opening of the circuit controlled by said interrupter to be drawn therein, and means for swinging said bridging means during the circuit-opening operation so as to cause an air gap to exist in the electrical circuit through said interrupter when said interrupter is in the open-circuit position, the gas evolved from said lining flowing longitudinally through said arc passage toward the open end thereof to extinguish the arc drawn therein by said movable conducting means.

3. In a circuit interrupter a pair of spaced contacts; a movable bridging means for electrically connecting said contacts when said interrupter is in the closed-circuit position; and actuating means for said interrupter; said bridging means including a tube, which is formed at least partially of insulating material and which is swingable into and out of engagement with at least one of said spaced contacts, and a conducting means movable through the passage within said tube during the operation of said interrupter; said actuating means, during the circuit-opening operation, causing said conducting means to move in said passage to establish the arc which is formed incident to the opening of the circuit controlled by said interrupter therewithin, and also swinging said tube out of engagement with at least one of said contacts to introduce an air break into the electrical circuit of said switch.

4. In an expulsion-type circuit interrupter; a pair of spaced conducting means; a movable bridging means for electrically connecting said conducting means when said interrupter is in the closed-circuit position; and actuating means for said interrupter; said bridging means including a swingably supported tube, at least a portion of which is lined with a solid material capable of evolving an arc extinguishing gas when placed in proximity to an electric arc, and a conducting means movable through the passage within said tube during the operation of said interrupter; said actuating means, during the circuit-opening operation, causing said conducting means to move through said passage to establish the arc which is formed incident to the opening of the circuit controlled by said interrupter therewithin, and also swinging said tube away from the normal closed-circuit position to effect a lengthening of the arc and to direct the outward flowing gases evolved from said lining away from said spaced conducting means.

5. In an expulsion-type circuit interrupter; a pair of spaced conducting means, a movable bridging means for electrically connecting said conducting means when said interrupter is in the closed-circuit position; and actuating means for said interrupter; said bridging means including a swingably supported tube at least partially of insulating material, and a conducting means movable through the passage within said tube during the operation of said interrupter; said actuating means including a pair of springs which are charged during the operation of said interrupter; one of said springs, during the circuit-opening operation; causing said conducting means to move through said passage at high speed to establish the arc which is formed incident to the opening of the circuit controlled by said interrupter therewithin; and the other of said springs, during the circuit-opening operation, causing said tube to swing away from the normal closed-circuit position to introduce an air break into the electrical circuit of said switch.

6. In an expulsion-type circuit interrupter; a pair of spaced conducting means; a movable bridging means for electrically connecting said conducting means when said interrupter is in the closed-circuit position; and actuating means for said interrupter; said bridging means including a swingably supported tube at least partially of insulating material, and a conducting means movable through the passage within said tube during the operation of said interrupter; said actuating means, during the circuit-opening operation, causing said conducting means to move through said passage to establish an arc therein, and also swinging said tube away from the normal closed-circuit position to effect a substantial lengthening of said arc; said movable conducting means being flexible in order that said tube may be swung while said conducting means is being moved therethrough.

7. In a circuit interrupter; a pair of spaced conducting members, a means, swingable between two extreme positions, for bridging said conducting members; and an actuating means for said interrupter; said swingable means including means for defining the walls of a tubular arc passage having a length substantially equal to the distance separating said conducting members, and flexible conducting means movable through said passage to open and to close the electrical circuit through said interrupter; said actuating means including a rotatable insulator, a drum means upon which said flexible conducting means is wound during the operation of said interrupter, means intermediate said rotatable insulator and said drum means whereby the rotation of said insulator is transmitted to said drum, and other means whereby the rotation of said insulator causes said tubular means to swing from one extreme position to the other.

8. In a circuit interrupter; a pair of spaced stationary insulator columns, a rotatable insulator column; conducting means mounted on each of said stationary insulator columns, a means, swingable between two positions, which is adapted to bridge said conducting means when said interrupter is in the closed-circuit position so as to provide an electrical circuit therebetween; said swingable bridging means comprising means for defining the walls of a tubular arc passage having a length substantially equal to the distance separating said conducting members, and flexible conducting means movable through said passage to open and to close the electrical circuit through said interrupter; said actuating means including a drum means upon which said flexible conducting means is wound and from which said flexible conducting means is unwound during the operation of said interrupter, spring means associated with said drum means, and means whereby the rotation of said rotatable insulator during the circuit-opening operation first charges said spring and then releases the energy stored therein so as to cause said drum to rotate in such manner that said conducting means is moved through said arc passage at high speed.

9. In a circuit interrupter; a pair of spaced stationary insulator columns; a rotatable insulator column; conducting means mounted on each of said stationary insulator columns; a means, swingable between two positions, which is adapted to bridge said conducting means when said interrupter is in the closed-circuit position so as to provide an elecrical circuit therebetween, said swingable bridging means comprising means for defining the walls of a tubular arc passage having a length substantially equal to the distance separating said conducting members, and flexible conducting means movable through said passage to open and to close the electrical circuit through said interrupter; at least a portion of said tubular arc passage being lined with a solid material that is capable of evolving an arc extinguishing gas when placed in proximity to an electric arc; said actuating means including a drum means upon which said flexible conducting means is wound and from which said flexible conducting means is unwound during the operation of said interrupter, spring means associated with said drum, means, and means whereby the rotation of said rotatable insulator during the circuit-opening operation first charges said spring and then releases the energy stored therein so as to cause said conducting means to be moved through said arc passage at high speed.

10. In a circuit interrupter; a pair of spaced stationary insulator columns; a rotatable insulator column; a contact mounted on each of said stationary insulator columns; a movable means adapted to bridge said contacts when said interrupter is in the closed-circuit position so as to provide an electrical circuit therebetween; said movable bridging means comprising conducting means, and a tubular means for defining an arc passage wherein said conducting means is adapted to move; and actuating means for said interrupter including means operable in response to the rotation of said rotatable insulator column to cause said conducting means to move through said tubular means to draw an arc therein and to then cause said tubular means to move out of engagement with at least one of said contacts so as to cause an air gap to exist in the electrical circuit through said interrupter when said interrupter is in the open-circuit position.

11. In a circuit interrupter, a pair of spaced stationary insulator columns; a rotatable insulator column; conducting means mounted on each of said stationary insulator columns; a swingable blade means adapted to bridge said conducting means when said interrupter is in the closed-circuit position; means of considerably greater arc interrupting capacity than said swingable blade means for extinguishing the arcs which are formed incident to the opening of the circuit controlled by said interrupter; said second interrupting means comprising conducting means, and a tubular means for defining an arc passage wherein said conducting means is adapted to move; and actuating means for said interrupter including means operable in response to the rotation of said rotatable insulator column to cause said blade means to swing to the open-circuit position, to cause said conducting means to move through said tubular means, in order that the circuit shall be opened by said second interrupting means during each operation of said interrupter, and to swing said tubular means out of engagement with at least one of said conducting means.

12. In a circuit interrupter; a pair of spaced stationary insulator columns; a rotatable insulator column; conducting means mounted on each of said stationary insulator columns; a swingable blade means adapted to bridge said conducting means when said interrupter is in the closed-circuit position; means of considerably greater arc interrupting capacity than said swingable blade means for extinguishing the arcs which are formed incident to the opening of the circuit controlled by said interrupter; said second interrupting means comprising conducting means, and a tubular means for defining an arc passage wherein said conducting means is adapted to move; and actuating means for said interrupter including means operable in response to the rotation of said rotatable insulator column to cause said blade means to swing to the open-circuit position, to cause said conducting means to move through said tubular means in order that the circuit shall be opened during each operation of said interrupter by said second interrupting means, and to swing said tubular means out of engagement with at least one of said conducting means in order that an air gap may exist in the electrical circuit through said interrupter when said interrupter is in the open circuit position.

13. In a circuit interrupter a pair of spaced stationary insulator columns; a rotatable insulator column; conducting means mounted on each of said stationary columns; a swingable blade means adapted to bridge said conducting means when said interrupter is in the closed-circuit position; means of considerably greater arc interrupting capacity than said swingable blade means for extinguishing the arcs which are formed incident to the opening of the circuit controlled by said interrupter; said interrupting means comprising conducting means and a tubular means for defining an arc passage wherein said conducting means is adapted to move, at least a portion of the inner surface of said tubular means being lined with a material that is capable of evolving an arc extinguishing gas when placed in proximity to an electric arc; said conducting means being so proportioned that said arc passage is substantially closed thereby, the opposite end of said arc passage being open during the circuit interrupting operation; and actuating means for said interrupter, including means operable in response to the rotation of said rotatable insulator column to cause said conducting means to move through said tubular means to draw an arc therein; said arc causing the evolution of considerable quantities of gas from the lined portion of said arc passage, which gas flows longitudinally through said passage with an expulsive action to effect the extinguishing of said arc.

14. In a circuit interrupter; a pair of spaced stationary insulator columns; a rotatable insulator column; conducting means mounted on each of said stationary insulator columns; a swingable blade means adapted to bridge said conducting means when said interrupter is in the closed-circuit position; means of considerably greater arc interrupting capacity than said swingable blade means for extinguishing the arcs which are formed incident to the opening of the circuit controlled by said interrupter; said second interrupting means comprising conducting means and a tubular means for defining a passage wherein said conducting means is adapted to move; and actuating means for said interrupter including means operable in response to the rotation of said rotatable insulator column to cause said blade means to be swung to the open-circuit position, and to cause said conducting means to move through said tubular means in order that the circuit shall be finally opened, during each operation of said interrupter, by said second interrupting means; said actuating means including a drum means upon which said flexible conducting means is wound and from which said flexible conducting means is unwound during the operation of said interrupter.

15. In a circuit interrupter; a pair of spaced contacts; a movable blade means which is adapted to bridge said contacts when said interrupter is in the closed circuit position; means of considerably greater arc interrupting capacity than said blade means, said second interrupting means being electrically connected in parallel with said blade at least during each opening operation of said interrupter and comprising conducting means and a tubular means for defining an arc passage wherein said conducting means is adapted to move; and actuating means for said interrupter, including means operable during each circuit opening operation to cause said blade means to move to the open circuit position, to positively move said conducting means through said tubular means in order that the circuit through said interrupter shall be opened by said second interrupting means during each operation thereof, and to move said tubular means out of engagement with at least one of said contacts in order that a visible air gap may exist in the electrical circuit through said interrupter when that device is in the open circuit position.

16. In a circuit interrupter; a pair of spaced, stationary insulator columns; conducting means mounted on each of said stationary insulator columns; a swingable blade means adapted to bridge said conducting means when said interrupter is in the closed circuit position; means of considerably greater arc interrupting capacity than said swingable blade means for extinguishing the arc which is formed incident to the opening of the circuit controlled by said interrupter, said second interrupting means including a swingably supported tube, at least a portion of which is lined with a solid material capable of evolving an arc extinguishing gas when placed in proximity to an electric arc, for defining the walls of an arc passage, and a conducting means movable through said arc passage during the operation of said interrupter, and actuating means for said interrupter, including means operable during each circuit opening operation to cause said blade means to swing to the open circuit position, to cause said conducting means to move through said arc passage to establish the arc which is formed incident to the opening of the circuit controlled by said interrupter therewithin, and to swing said tube away from the normal closed circuit position to effect the lengthening of the arc and to direct the outwardly flowing gases evolved from said lining away from said conducting means.

17. In a circuit interrupter; a pair of spaced stationary insulator columns; conducting means mounted on each of said stationary insulator columns; a swingable blade means adapted to bridge said conducting means when said interrupter is in the closed circuit position; means of considerably greater arc interrupting capacity than said swingable blade means for extinguishing the arc which is formed incident to the opening of the circuit controlled by said interrupter, said second interrupting means including a swingably supported tube, formed at least partially of insulating material, for defining the walls of an arc passage, and a conducting means movable longitudinally through said arc passage during the operation of said interrupter; and actuating means for said interrupter, including means operable during each circuit opening operation to cause said blade means to be swung to the open circuit position, to cause said conducting means to move through said passage to establish an arc therein, and to swing said tube away from the normal closed circuit position to effect a substantial lengthening of said arc, said conducting means movable through said arc passage being flexible in order that said tube may be swung while said conducting means is being moved longitudinally therethrough.

18. In an electric switch; a contact; a cooperating blade, which normally carries at least the greater portion of the current flowing through said switch, supported for swingable movement into and out of engagement with said contact; a circuit interrupting means of substantially greater arc extinguishing capacity than said blade, said means being electrically connected in parallel with said blade at least during each opening operation of said switch, and including a tube, which defines the walls of an arc passage and which is supported for swingable movement into and out of engagement with said contact, and means for establishing the arc incident to the opening operation of said switch within said passage; and actuating means for said switch operable during each opening operation of said switch first to swing said blade out of engagement with said contact and then to swing said tube out of engagement with said contact.

19. In a circuit interrupter; a contact; a cooperating blade, which normally carries at least the greater portion of the current flowing through said switch, supported for movement into and out of engagement with said contact; a circuit interrupting means of considerably greater arc extinguishing capacity than said blade, said means being electrically connected in parallel with said blade at least during each opening operation of said switch, and including a movably supported tube, which defines the walls of an arc passage, and means for establishing the arc incident to the opening operation of said switch within said passage; at least a portion of said tube being lined with a solid material capable of evolving an arc extinguishing gas when placed in proximity to an electric arc and said tube being movable into and out of engagement with said contact; and actuating means for said switch operable during each opening operation of said switch first to move said blade out of engagement with said contact and then to move said tube out of engagement with said contact to provide a visible air gap between said contact and said blade and tube.

20. In an electric switch; a pair of spaced, stationary insulator columns; a contact mounted on each of said columns; a blade, which normally carries at least the greater portion of the current flowing through said switch, supported for swingable movement from a normal open circuit position to a position where it bridges said contacts; a circuit interrupting means of greater arc extinguishing capacity than said blade which is adapted to provide an electrical circuit between said spaced contacts at least during each opening operation of said switch, said last-mentioned circuit interrupting means including a swingably supported tube which defines the walls of an arc passage, at least one end of which is open during each operation of said means, and conducting means movable through said arc passage to establish the arc incident to each opening operation of said switch therewithin; said tubular means being swingable into and out of engagement with at least one of said contacts and at least a portion thereof being lined with a material which is capable of evolving an arc extinguishing gas when brought into proximity with an electric arc; and actuating means for said switch so arranged that during each opening operation of said switch said blade means is moved out of engagement with at least one of said contacts a predetermined distance before said tube is moved any substantial distance, and then said tube is moved out of engagement with at least one of said contacts.

21. In a load break disconnect device, a pair of terminals, a movable blade member for bridging said terminals, an arc extinguisher having an arc passage and conducting means therethrough, said conducting means being normally connected in parallel with said blade member across said terminals and movable for establishing an arc within said passage and to make and break the circuit between said terminals, an actuating means for said blade member and for said conducting means operative for moving said blade member out of engagement with at least one of said terminals prior to causing said conducting means to be moved to open circuit position, said blade member, arc extinguisher and conducting means when actuated to the open position being visibly separated from at least one of said terminals a distance sufficient to withstand line voltage.

22. In a load break disconnect device, a pair of terminals, a movable blade member for bridging said terminals, conducting means connected across said terminals normally paralleling said blade member, said conducting means including a contact member, an arc extinguishing housing surrounding said contact member, said contact member being movable within said housing to open and closed positions to respectively interrupt and establish the circuit between said terminals, and actuating means for said blade member and said contact member operative for moving said blade member out of engagement with at least one of said terminals prior to causing said contact member to be moved to the open circuit position, said blade and said arc extinguishing housing including said contact member when in the open position being separated a substantial distance from all conducting parts of at least one of said terminals to provide an air gap sufficient to withstand high voltage.

23. The combination with a switch having a contact and a blade member operable into and out of engagement with said contact of an arc extinguishing device having an arc chamber, conducting means for normally establishing a circuit through said arc extinguishing device in parallel with said blade member, said conducting means including a contact member movable within said arc chamber to open and closed positions, and joint means operative to disengage said blade member from said contact prior to actuating said contact member to open circuit position and to cause a separation in air of said blade member, arc extinguishing device including said contact member and switch contact sufficient to withstand high voltage.

24. In an electric switch, a contact, a cooperating blade for normally carrying the greater portion of the current flowing through said switch, means for supporting said blade for swingable movement into and out of engagement with said contact, a circuit interrupting means of substantially greater arc extinguishing capacity than said blade, said circuit interrupting means being electrically connected in parallel with said blade at least during each opening operation of said switch and including a tube defining the walls of an arc passage, a contact member movable within said tube for establishing and breaking the circuit through said circuit interrupting means, and actuating means for said switch first to swing said blade out of engagement with said contact and then to move said contact member to the circuit interrupting position, and finally to introduce a visible air gap between said blade tube, and contact member and said contact of lengths sufficient to withstand high electrical tension.

HERBERT J. CRABBS.